United States Patent
Hara (10) Patent No.: US 11,983,941 B2
(45) Date of Patent: May 14, 2024

(54) DRIVER MONITOR

(71) Applicant: TOYOTA JIDOSHA KABUSHIKI KAISHA, Toyota (JP)

(72) Inventor: Kenichiroh Hara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 17/350,208

(22) Filed: Jun. 17, 2021

(65) Prior Publication Data
US 2022/0004789 A1    Jan. 6, 2022

(30) Foreign Application Priority Data

Jul. 2, 2020   (JP) .................................. 2020-114989

(51) Int. Cl.
G06V 20/59   (2022.01)
G06V 40/16   (2022.01)

(52) U.S. Cl.
CPC .......... *G06V 20/597* (2022.01); *G06V 40/162* (2022.01); *G06V 40/169* (2022.01)

(58) Field of Classification Search
None
See application file for complete search history.

(56) References Cited

U.S. PATENT DOCUMENTS

| | | | |
|---|---|---|---|
| 10,442,443 B1 * | 10/2019 | Li | B60W 50/10 |
| 2018/0047230 A1 * | 2/2018 | Nye | G07C 9/37 |
| 2019/0272691 A1 * | 9/2019 | Nye | G07C 9/38 |
| 2021/0034887 A1 * | 2/2021 | Tahara | G06V 40/18 |

FOREIGN PATENT DOCUMENTS

| | | |
|---|---|---|
| JP | 2007-295946 A | 11/2007 |
| JP | 2010-052635 A | 3/2010 |
| JP | 2011-118565 A | 6/2011 |
| WO | 2019/159364 A1 | 8/2019 |
| WO | 2020/129146 A1 | 6/2020 |

OTHER PUBLICATIONS

Wang et al., "Continuous Driver's Gaze Zone Estimation Using RGB-D Camera," Sensors 2019, 19, 1287 (Year: 2019).*
Craye et al., "Driver distraction detection and recognition using RGB-D sensor," arXiv:1502.00250v1 [cs.CV] Feb. 1, 2015 (Year: 2015).*

* cited by examiner

*Primary Examiner* — Soo Shin
(74) *Attorney, Agent, or Firm* — Oliff PLC (57) ABSTRACT

A driver monitor detects, based on face images obtained by capturing the face of a driver of a vehicle at different times, a color of the face of the driver and a face orientation angle of the driver in each face image; stores, when a face orientation angle detected from a first face image captured at a first time is included in a predetermined range of face orientation angles, the color detected from the first face image in a memory; and determines that the color of the face is abnormal, when a face orientation angle detected from a second face image captured at a second time later than the first time is included in the range of face orientation angles and a difference between the color detected from the second face image and the color stored in the memory exceeds a variance threshold.

6 Claims, 6 Drawing Sheets

DRIVER MONITOR

FIELD

The present disclosure relates to a driver monitor for monitoring the complexion of a vehicle driver.

BACKGROUND

The complexion of a vehicle driver changes depending on his/her physical condition. When the complexion of a driver differs from a normal one, his/her physical condition may be unusual, resulting in a high risk of a traffic accident. A technique has been proposed to monitor the complexion of a driver during driving and to control motion of the vehicle, based on a change in complexion.

Japanese Unexamined Patent Publication No. 2010-052635 describes a device for preventing drunk driving. This device compares a face image of a vehicle driver captured by an image capturing unit with a face image stored in a storage unit to determine the presence or absence of a change in complexion, and, if any, executes control of stopping the vehicle.

SUMMARY

A driver turns his/her face in various directions in order to sufficiently pay attention to surroundings of the vehicle. Disagreement of the orientations of the face between a captured face image and a stored face image may result in a failure of appropriate determination on a change in complexion.

It is an object of the present disclosure to provide a driver monitor that appropriately determines a change in driver's complexion.

A driver monitor according to the present disclosure includes a processor configured to detect, based on face images obtained by capturing the face of a driver of a vehicle at different times, a color of a predetermined region of the face of the driver and a face orientation angle formed between a front-back direction of the vehicle and an orientation of the face of the driver in each face image; store, when a face orientation angle detected from a first face image captured at a first time is included in a predetermined range of face orientation angles, the color of the predetermined region detected from the first face image in a memory; and determine that the color of the face is abnormal, when a face orientation angle detected from a second face image captured at a second time later than the first time is included in the range of face orientation angles and a difference between the color of the predetermined region detected from the second face image and the color of the predetermined region stored in the memory exceeds a variance threshold.

Regarding the driver monitor according to the present disclosure, it is preferable that the first time is a first period of time before the driver getting out of the vehicle, and that the second time is a second period of time after the driver getting in the vehicle.

Regarding the driver monitor according to the present disclosure, it is preferable that the first time is a first period of time before turn-off of a drive source of the vehicle, and that the second time is a second period of time after turn-on of the drive source of the vehicle.

The processor of the driver monitor according to the present disclosure is preferably further configured to detect which of persons the driver of the vehicle is, store the color of the predetermined region for each detected person, and determine whether the color of the face is abnormal for each detected person.

The processor of the driver monitor according to the present disclosure is preferably further configured to execute control of notifying the driver or stopping the vehicle when it is determined that the color of the face is abnormal.

A method for monitoring a driver according to the present disclosure includes detecting, based on face images obtained by capturing the face of a driver of a vehicle at different times, a color of a predetermined region of the face of the driver and a face orientation angle formed between a front-back direction of the vehicle and an orientation of the face of the driver in each face image; storing, when a face orientation angle detected from a first face image captured at a first time is included in a predetermined range of face orientation angles, the color of the predetermined region detected from the first face image in a memory; and determining that the color of the face is abnormal, when a face orientation angle detected from a second face image captured at a second time later than the first time is included in the range of face orientation angles and a difference between the color of the predetermined region detected from the second face image and the color stored in the memory exceeds a variance threshold.

The driver monitor according to the present disclosure can appropriately determine a change in driver's complexion.

DESCRIPTION OF EMBODIMENTS

Hereinafter, a driver monitor that appropriately determines a change in driver's complexion will be explained in detail with reference to the accompanying drawings. Based on face images obtained by capturing the face of a driver of a vehicle at different times, the driver monitor detects a color of a predetermined region of the face of the driver and a face orientation angle formed between a front-back direction of the vehicle and an orientation of the face of the driver in each face image. When a face orientation angle detected from a first face image captured at a first time is included in a predetermined range of face orientation angles, the driver monitor stores the color of the predetermined region detected from the first face image in a storage unit or a memory. The driver monitor determines that the color of the face is abnormal, when a face orientation angle detected from a second face image captured at a second time later than the first time is included in the range of face orientation angles and a difference between the color of the predetermined region detected from the second face image and the color of the predetermined region stored in the storage unit exceeds a variance threshold.

Figure 1:
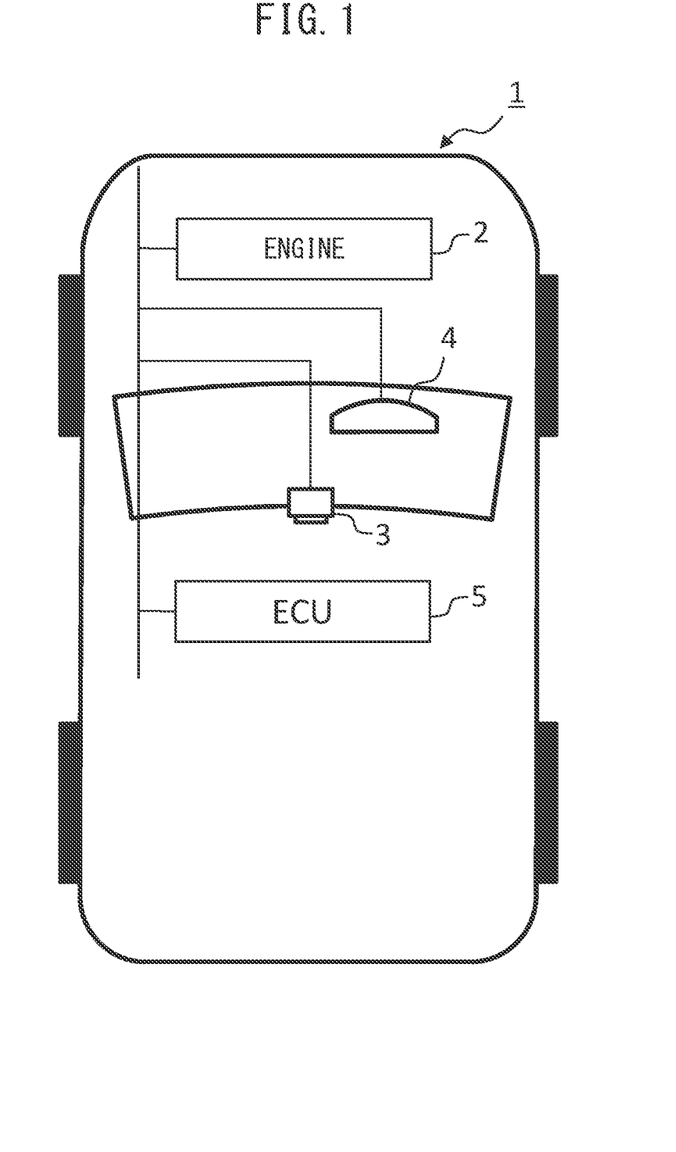
FIG. 1 schematically illustrates the configuration of a vehicle including a driver monitor.

FIG. 1 schematically illustrates the configuration of a vehicle including the driver monitor.

The vehicle 1 includes an engine 2, a driver monitoring camera 3, a meter display 4, and an electronic control unit (ECU) 5. The engine 2, the driver monitoring camera 3, and the meter display 4 are connected to the ECU 5 via an in-vehicle network conforming to a standard, such as a controller area network, so that they can communicate with each other.

The engine 2, which is an example of a drive source of the vehicle 1, supplies motive power that moves the vehicle 1. Being turned on, the engine 2 is started and becomes able to supply motive power to the vehicle 1. Being turned off, the engine 2 is stopped and becomes unable to supply motive power to the vehicle 1. Instead of the engine 2, a motor that uses electric power to supply motive power may be mounted on the vehicle 1 as a drive source.

The driver monitoring camera 3 is an example of a sensor for capturing a face image of a driver. The driver monitoring camera 3 includes a two-dimensional detector constructed from an array of optoelectronic transducers, such as CCD or C-MOS, having sensitivity to visible light and a focusing optical system focusing an image of a target region on the two-dimensional detector. The driver monitoring camera 3 is mounted, for example, in a front and upper area in the interior of the vehicle so as to be oriented toward the face of the driver sitting on the driver's seat. The driver monitoring camera 3 outputs a face image showing the driver's face every predetermined capturing period (e.g., 1 to 10 minutes). The face image is a color image whose pixels each have values of RGB (Red, Green, and Blue).

The meter display 4, which is an example of a display, includes, for example, a liquid crystal display. The meter display 4 displays information related to travel of the vehicle 1 so as to be visible to the driver, according to a signal received from the ECU 5 via the in-vehicle network.

The ECU 5, which is an example of the driver monitor, executes a driver monitoring process, using images generated by the driver monitoring camera 3, and operates the meter display 4.

Figure 2:
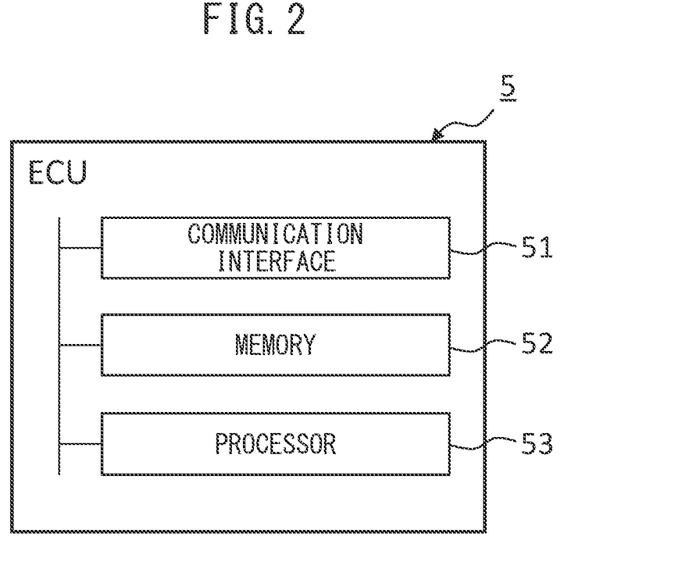
FIG. 2 schematically illustrates the hardware of an ECU.

FIG. 2 schematically illustrates the hardware of the ECU 5. The ECU 5 includes a communication interface 51, a memory 52, and a processor 53.

The communication interface 51, which is an example of a communication unit, includes a communication interface circuit for connecting the ECU 5 to the in-vehicle network. The communication interface 51 provides received data for the processor 53, and outputs data provided from the processor 53 to an external device.

The memory 52, which is an example of a storage unit, includes volatile and nonvolatile semiconductor memories. The memory 52 stores various types of data used for processing by the processor 53, e.g., a range of face orientation angles for determining whether to store a detected color of the driver's face, based on his/her face orientation angle; complexion information indicating a detected color of the face; and a variance threshold for determining whether the color of the driver's face is abnormal. The memory 52 also stores various application programs, such as a driver monitoring program to execute a driver monitoring process.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 3:
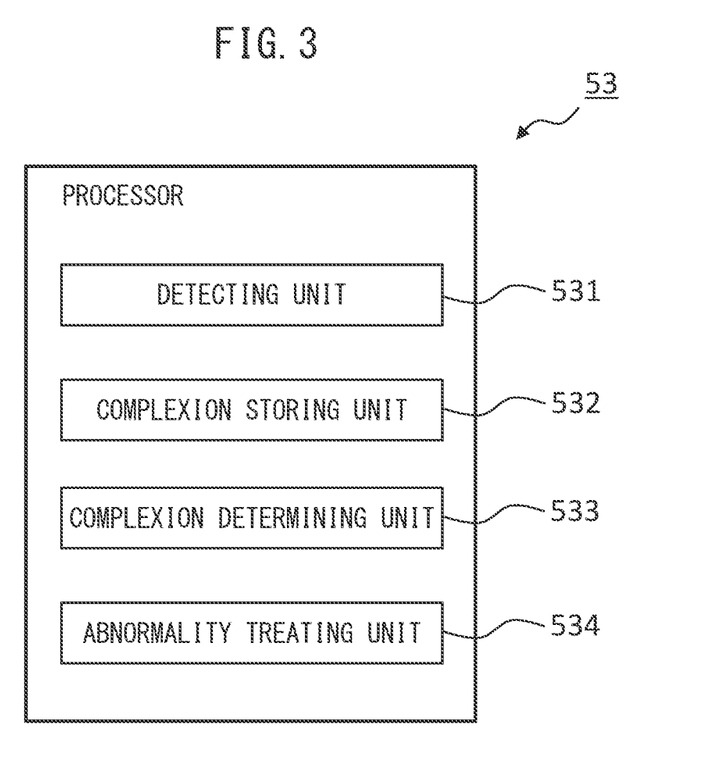
FIG. 3 is a functional block diagram of a processor included in the ECU.

FIG. 3 is a functional block diagram of the processor 53 included in the ECU 5.

The processor 53 of the ECU 5 includes, as its functional blocks, a detecting unit 531, a complexion storing unit 532, a complexion determining unit 533, and an abnormality treating unit 534. These units included in the processor 53 are functional modules implemented by a program executed on the processor 53, or may be implemented in the ECU 5 as separate integrated circuits, microprocessors, or firmware.

The detecting unit 531 repeatedly receives, at different times, face images obtained by capturing the face of the driver of the vehicle 1 from the driver monitoring camera 3. The detecting unit 531 detects the face orientation angle of the driver and the color of a predetermined region of the driver's face, based on each received face image.

The face orientation angle is expressed as an angle in a horizontal or vertical plane between the travel direction of the vehicle 1 and the direction in which the driver's face is oriented. The detecting unit 531 inputs a received face image into a classifier that has been trained to detect predetermined facial parts, such as the inner and outer canthi and the corners of the mouth, thereby identifying the positions of the predetermined parts included in the face image. The detecting unit 531 then compares the positions of the predetermined parts detected from the face image with a three-dimensional model of a standard face. As the face orientation angle of the face image, the detecting unit 531 detects the face orientation angle of the three-dimensional model for which the position of each part best fits that of the corresponding part detected from the face image.

The classifier may be, for example, a convolutional neural network (CNN) including multiple layers connected in series from the input toward the output. A CNN that has been trained using inputted face images including predetermined facial parts as training data operates as a classifier to identify the positions of such parts.

The detecting unit 531 also detects the color of a predetermined region in the driver's face, such as the cheek or the forehead. The detecting unit 531 identifies a region of the face image corresponding to the predetermined region in the three-dimensional model of a standard face that has been compared based on the identified predetermined parts, and detects a representative value of the color of the identified region. The detecting unit 531 converts the values of the pixels included in the identified region from RGB representation to HSV (Hue, Saturation, Value of brightness) representation. Of the values of the pixels included in the identified region represented in HSV, the detecting unit 531 detects the average of the values of H as the representative value of the color of the identified region. The detecting unit 531 may detect the mode or median of the values of H as the representative value of the color of the identified region. In addition to the value of H, the detecting unit 531 may detect representative values of the values of S and V of the pixels included in the region as the representative value of the color of the identified region. Alternatively, the detecting unit 531 may use a representative value based on RGB values rather than HSV values as the representative value of the color of the region. In this case, the detecting unit 531 does not convert into HSV form those values of the pixels in the face image obtained from the driver monitoring camera 3 which are represented in RGB form.

The complexion storing unit 532 determines whether the face orientation angle detected by the detecting unit 531 is included in the range of face orientation angles (e.g., ±30 degrees) stored in the memory 52. When it is determined that the detected face orientation angle is included in the range of face orientation angles, the complexion storing unit 532 stores in the memory 52 the representative value of the detected color of the region.

The complexion determining unit 533 compares, with the color of the predetermined region stored in the memory 52, the color of the predetermined region detected when the face orientation angle is included in the range of face orientation angles. When the difference in color exceeds the variance threshold stored in the memory 52, the complexion determining unit 533 determines that the color of the driver's face is abnormal.

In the case that the detecting unit 531 detects the value of H as the color of the predetermined region, the variance threshold is set for the value of H. In this case, regarding the value of H, the complexion determining unit 533 compares the detected color of the predetermined region with the color of the predetermined region stored in the memory 52. When the difference in the value of H exceeds the variance threshold, the complexion determining unit 533 determines that the color of the driver's face is abnormal. In the case that the detecting unit 531 detects the values of H, S, and V as the color of the predetermined region, the variance threshold is set for H, S, and V individually. In this case, for each of the values of H, S, and V, the complexion determining unit 533 compares the detected color of the predetermined region with the color of the predetermined region stored in the memory 52. When the differences exceed the respective variance thresholds regarding all or more than half of H, S, and V, the complexion determining unit 533 determines that the color of the driver's face is abnormal. Alternatively, the complexion determining unit 533 may compare a value obtained by substituting the differences (Dh, Ds, and Dv) respectively calculated for H, S, and V into a predetermined computational expression (D=a*Dh+b*Ds+c*Dv) with a single variance threshold, thereby determining whether the color of the face is abnormal. In the case that the detecting unit 531 detects the color of the region in RGB rather than in HSV, the complexion determining unit 533 can make determination on the color of the face in the same manner as determination in HSV.

When it is determined by the complexion determining unit 533 that the color of the driver's face is abnormal, the abnormality treating unit 534 executes control of the vehicle 1 to treat this abnormality. The abnormality treating unit 534 transmits a predetermined control signal to the meter display 4 via the in-vehicle network to display an image for notifying the driver that an abnormality of the color of the face has been detected. Alternatively, the abnormality treating unit 534 transmits a predetermined control signal via the in-vehicle network to the engine 2, a brake device (not shown) for decelerating the vehicle 1, and a steering device (not shown) for changing the travel direction of the vehicle 1 to stop the vehicle 1.

The abnormality treating unit 534 may transmit a predetermined control signal to a speaker (not shown) via the in-vehicle network to play back a voice for making notification that an abnormality of the color of the driver's face has been detected. The abnormality treating unit 534 may transmit a predetermined control signal via the in-vehicle network to a data communication module for wireless communication with a device outside the vehicle, thereby transmitting to a server (not shown) data representing that an abnormality of the color of the driver's face has been detected. Receiving data representing that an abnormality of the color of the driver's face has been detected, the server can execute control, such as making an ambulance head for the vehicle 1 or drawing attention of vehicles traveling near the vehicle 1.

Figure 4:
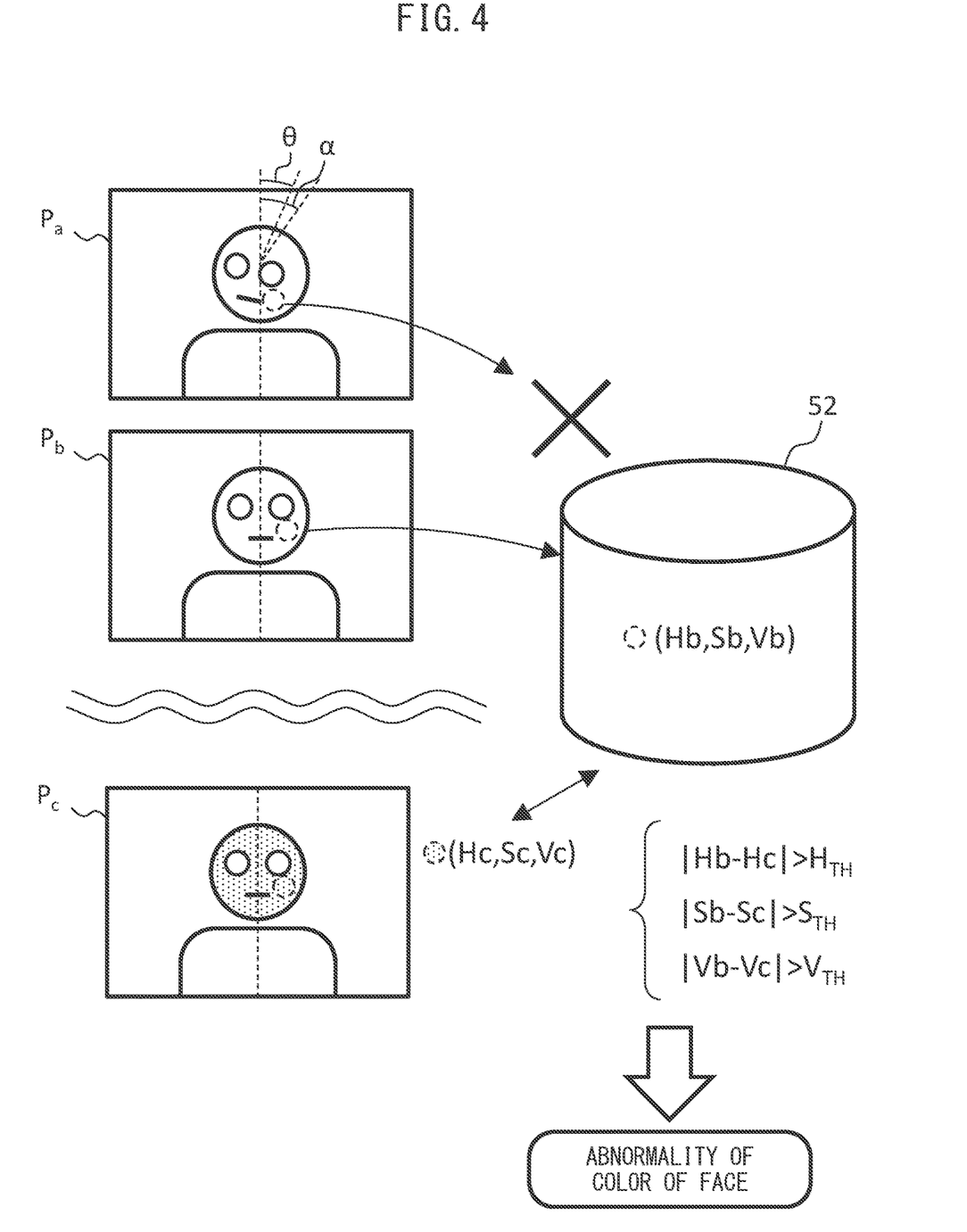
FIG. 4 is a diagram for briefly describing operation of the driver monitor.

FIG. 4 is a diagram for briefly describing operation of the driver monitor.

Images Pa and Pb in FIG. 4 are face images obtained from the driver monitoring camera 3. The face orientation angle of the driver detected from the image Pa is α. The face orientation angle α in the image Pa exceeds the upper-limit angle θ of the range of face orientation angles, and is not included in this range. Hence the color of the predetermined region detected from the image Pa is not stored in the memory 52.

The face orientation angle of the driver detected from the image Pb is 0 degrees, and is included in the range of face orientation angles. Hence the color (Hb, Sb, and Vb) of the predetermined region detected from the image Pb is stored in the memory 52.

An image Pc is an image obtained from the driver monitoring camera 3. The face orientation angle of the driver detected from the image Pc is 0 degrees, and is included in the range of face orientation angles. Hence the color (Hc, Sc, and Vc) of the predetermined region detected from the image Pc is compared with the color (Hb, Sb, and Vb) of the predetermined region stored in the memory 52. When the absolute value of the difference between Hb and Hc, that of the difference between Sb and Sc, and that of the difference between Vb and Vc are greater than a variance threshold $H_{TH}$ for H, a variance threshold $S_{TH}$ for S, and a variance threshold $V_{TH}$ for V, respectively, it is determined that the color of the face is abnormal.

Figure 5:
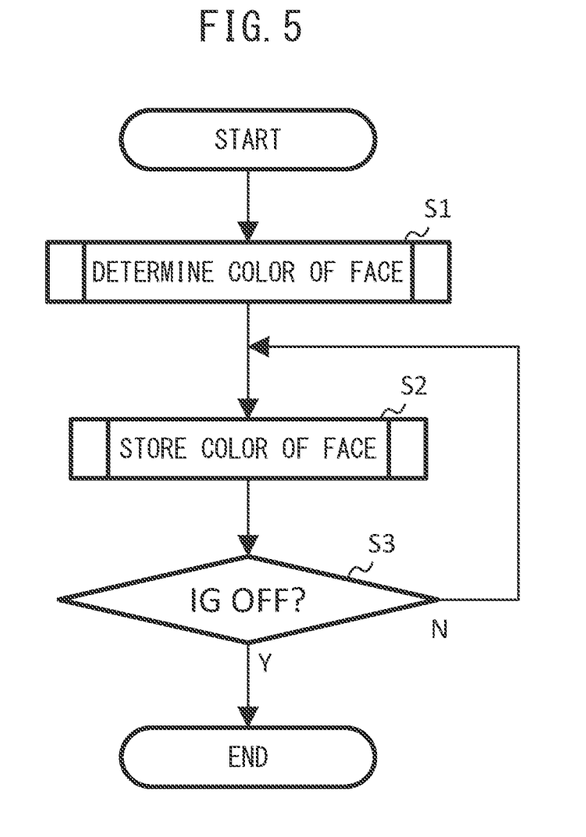
FIG. 5 is a flowchart of a driver monitoring process.

FIG. 5 is a flowchart of a driver monitoring process. The processor 53 of the ECU 5 executes the driver monitoring process from turn-on of the engine 2 of the vehicle 1 until turn-off thereof.

First, when the engine 2 is turned on, the processor 53 executes a complexion determining process (step S1) to determine whether the color of the driver's face is abnormal, based on a face image obtained from the driver monitoring camera 3 and information on the color of the predetermined region stored in the memory 52 in the last driver monitoring process. Details of the complexion determining process will be described below. Subsequently, the processor 53 executes a complexion storing process (step S2) to store in the memory 52 information on the color of the predetermined region detected from the face image obtained from the driver monitoring camera 3. Details of the complexion storing process will be described below. The processor 53 determines whether the engine 2 is OFF (step S3), and, when it is not OFF (No in step S3), repeats the complexion storing process every predetermined period. When the engine 2 is OFF (Yes in step S3), the processor 53 terminates the driver monitoring process.

The time when the complexion storing process of step S2 is executed immediately before detection of turn-off of the engine 2 in step S3 is an example of the first time. The period (e.g., 1 minute) from execution of the complexion storing process of step S2 until detection of turn-off of the engine 2 in step S3 is an example of the first period of time. The time when the complexion determining process of step S1 is executed is an example of the second time later than the first time. The period (e.g., 1 minute) from turn-on of the engine 2 until execution of the complexion determining process of step S1 is an example of the second period of time. In the complexion determining process, the information on the color of the predetermined region stored in the memory 52 in the last driver monitoring process at a time a predetermined period before turn-off of the engine is used. For this reason, at the first execution of the driver monitoring process, the complexion determining process is not executed. At the first execution of the driver monitoring process, the processor 53 may use a preset initial value as the information on the color of the predetermined region to execute the complexion determining process.

Figure 6:
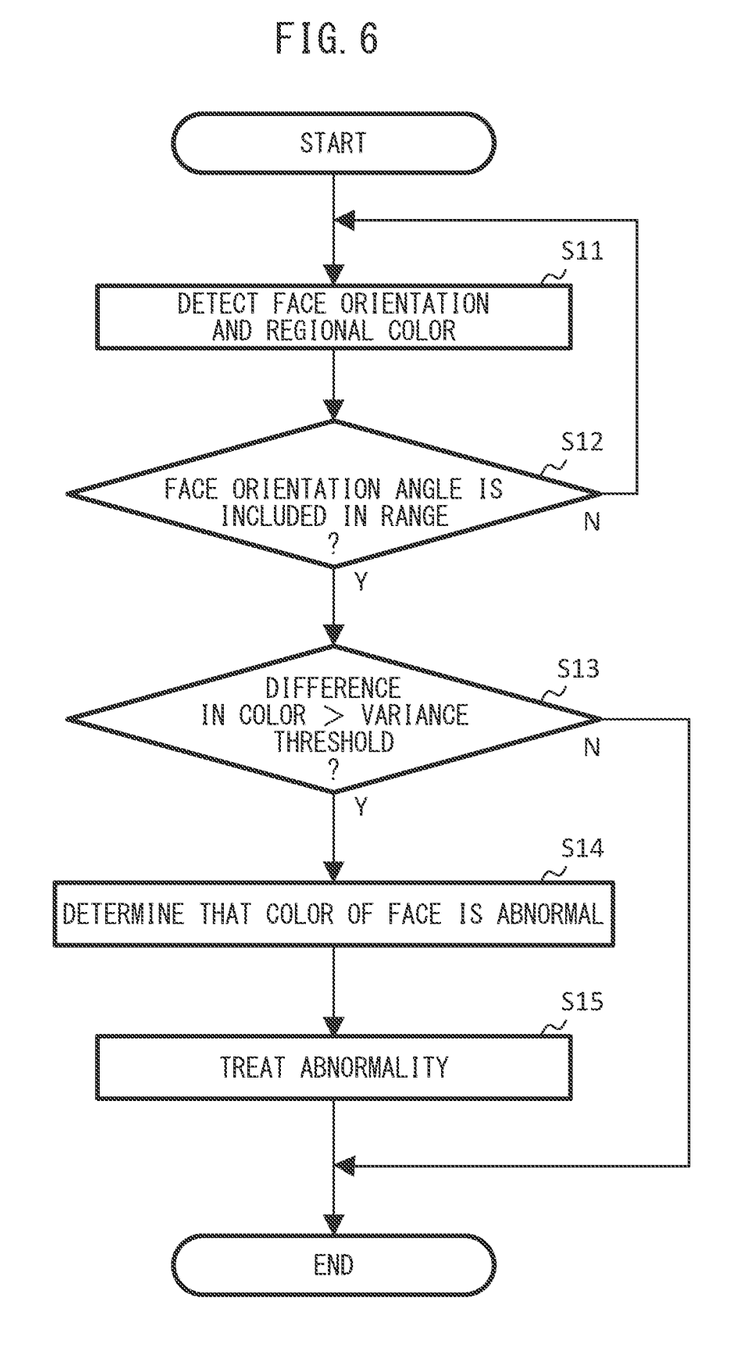
FIG. 6 is a flowchart of a complexion determining process.

FIG. 6 is a flowchart of the complexion determining process. The processor 53 of the ECU 5 executes the following complexion determining process in step S1 of the driver monitoring process.

First, the detecting unit 531 of the processor 53 detects the face orientation angle and the color of the predetermined region of the face of the driver of the vehicle 1, based on a face image obtained by capturing the driver's face (step S11).

Next, the complexion determining unit 533 of the processor 53 determines whether the detected face orientation angle is included in the predetermined range of face orientation angles (step S12). When it is determined that the detected face orientation angle is not included in the predetermined range of face orientation angles (No in step S12), the process by the processor 53 returns to step S11 and the detecting unit repeats detection of the face orientation angle and the color of the predetermined region.

When it is determined that the detected face orientation angle is included in the predetermined range of face orientation angles (Yes in step S12), the complexion determining unit 533 determines whether the difference between the detected color of the predetermined region and the color of the predetermined region stored in the memory 52 exceeds the variance threshold (step S13).

When it is determined that the difference in color exceeds the variance threshold (Yes in step S13), the complexion determining unit 533 determines that the color of the face is abnormal (step S14). Then, the abnormality treating unit 534 of the processor 53 executes predetermined processing (step S15), and terminates the complexion determining process. When it is determined that the difference in color does not exceed the variance threshold (No in step S13), the complexion determining unit 533 terminates the complexion determining process without determining that the color of the face is abnormal.

Figure 7:
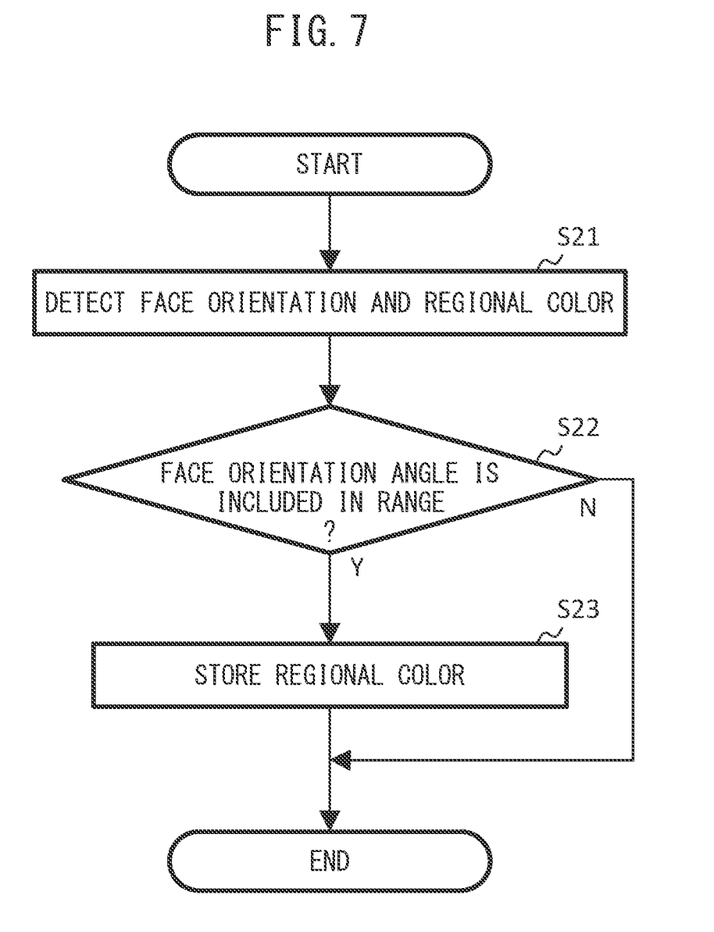
FIG. 7 is a flowchart of a complexion storing process.

FIG. 7 is a flowchart of the complexion storing process. The processor 53 of the ECU 5 executes the following complexion storing process in step S2 of the driver monitoring process.

First, the detecting unit 531 of the processor 53 detects the face orientation angle and the color of the predetermined region of the face of the driver of the vehicle 1, based on a face image obtained by capturing the driver's face (step S21).

Next, the complexion storing unit 532 of the processor 53 determines whether the detected face orientation angle is included in the predetermined range of face orientation angles (step S22). When it is determined that the detected face orientation angle is not included in the predetermined range of face orientation angles (No in step S22), the complexion storing unit 532 terminates the complexion storing process.

When it is determined that the detected face orientation angle is included in the predetermined range of face orientation angles (Yes in step S22), the complexion storing unit 532 stores the detected color of the predetermined region in the memory 52 (step S23) and terminates the complexion storing process.

Operating as describe above, the driver monitor of the present embodiment can appropriately determine a change in driver's complexion.

According to a modified example, the driver monitor executes the driver monitoring process with the first time being set at a time a first period of time before the driver getting out of the vehicle 1 and the second time being set at a time a second period of time after the driver getting in the vehicle 1. In this case, the driver monitor determines that the time when a key for the driver to turn on or off the engine 2 of the vehicle 1 is detected is the time of getting in, and that the time when the key becomes undetected is the time of getting out. This operation enables the driver monitor to make, based on the color of the face stored during a trip between the driver's getting in and out, determination on the color of the face in the next trip. The driver monitor may determine that the time when a face region corresponding to the driver's face is detected from an image obtained from the driver monitoring camera 3 is the time of getting in, and that the time when the face region becomes undetected is the time of getting out. Alternatively, the driver monitor may determine that the time when a weight exceeding a predetermined weight threshold is detected by a weight sensor (not shown) provided in the driver's seat of the vehicle 1 is the time of getting in, and that the time when the weight exceeding the weight threshold becomes undetected is the time of getting out.

According to another modified example, in the case that there are possible drivers of the vehicle 1, the driver monitor determines whether the color of the driver's face is abnormal for each driver. To this end, the detecting unit 531 first detects which of persons the driver of the vehicle 1 is, based on a face image. The detecting unit 531 inputs the obtained face image into a classifier that has been trained to detect the difference in characteristics of faces between persons, thereby detecting the person shown in the face image.

Then, the complexion storing unit 532 stores the color of the predetermined region detected from the face image for each detected person. The complexion determining unit 533 determines whether the color of the face is abnormal for each detected person.

The detecting unit 531 may detect a person by a method other than detection of a person based on a face image. For example, the detecting unit 531 may detect which of persons the driver is, based on an identifier of a key used by the driver to turn on the engine 2.

Note that those skilled in the art can apply various changes, substitutions, and modifications without departing from the spirit and scope of the present disclosure.

What is claimed is:

1. A driver monitor comprising a processor configured to
    detect a color of a predetermined region of a face of a driver in each of face images obtained by capturing the face of the driver of a vehicle at different times;
    detect a face orientation angle in a horizontal or vertical plane between a front-back direction of the vehicle and an orientation of the face of the driver in each of the face images by comparing predetermined facial features in each of the face images with a three-dimensional model of a standard face;
    disregard one or more of the face images where the orientation of the face of the driver is outside of a predetermined range of face orientation angles;
    determine that a first face image of the face images at a first time has the face orientation angle within the predetermined range of face orientation angles;
    determine that a second face image of the face images at a second time later than the first time has the face orientation angle within the predetermined range of face orientation angles; and
    determine that the color of the face in the second face image is abnormal when a difference between the color of the predetermined region of the second face image and the color of the predetermined region of the first face image exceeds a variance threshold.

2. The driver monitor according to claim 1, wherein the first time is a first period of time before the driver getting out of the vehicle, and the second time is a second period of time after the driver getting in the vehicle.

3. The driver monitor according to claim 1, wherein the first time is a first period of time before turn-off of a drive source of the vehicle, and the second time is a second period of time after turn-on of the drive source of the vehicle.

4. The driver monitor according to claim 1, wherein the processor is further configured to
detect which of persons the driver of the vehicle is, and
determine whether the color of the face is abnormal for each detected person.

5. The driver monitor according to claim 1, wherein the processor is further configured to notify the driver or stop the vehicle when the color of the face in the second face image is abnormal.

6. A method for monitoring a driver, comprising:
detecting a color of a predetermined region of a face of the driver and a face orientation angle in a horizontal or vertical plane between a front-back direction of a vehicle in each of face images obtained by capturing the face of the driver of the vehicle at different times, wherein the orientation angle is detected by comparing predetermined facial features in each of the face images with a three-dimensional model of a standard face;
detecting an orientation of the face of the driver in each of the face images;
disregarding one or more of the face images where the orientation of the face of the driver is outside of a predetermined range of face orientation angles;
determining that a first face image of the face images at a first time has the face orientation angle within the predetermined range of face orientation angles;
determining that a second face image of the face images at a second time later than the first time has the face orientation angle within the predetermined range of face orientation angles; and
determining that the color of the face in the second face image is abnormal when a difference between the color of the predetermined region of the second face image and the color of the predetermined region of the first face image exceeds a variance threshold.

* * * * *